(12) United States Patent
Monier et al.

(10) Patent No.: US 10,834,011 B2
(45) Date of Patent: Nov. 10, 2020

(54) PACKET SERVICING PRIORITY BASED ON COMMUNICATION INITIALIZATION

(71) Applicant: Itron Global SARL, Liberty Lake, WA (US)

(72) Inventors: Fabrice Monier, Bry sur Marne (FR); Imad Jamil, Meudon (FR); Yacine Khaled, Issy les Moulineaux (FR); Iskander Banaouas, Issy les Moulinea (FR)

(73) Assignee: Itron Global SARL, Liberty Lake, WA (US)

( * ) Notice: Subject to any disclaimer, the term of this patent is extended or adjusted under 35 U.S.C. 154(b) by 156 days.

(21) Appl. No.: 15/637,918

(22) Filed: Jun. 29, 2017

(65) Prior Publication Data

US 2019/0007333 A1   Jan. 3, 2019

(51) Int. Cl.
| | |
|---|---|
| *H04L 12/863* | (2013.01) |
| *H04L 12/865* | (2013.01) |
| *H04L 12/841* | (2013.01) |
| *H04W 72/12* | (2009.01) |
| *H04L 12/851* | (2013.01) |
| *H04L 12/875* | (2013.01) |
| *H04L 12/725* | (2013.01) |
| *H04W 88/08* | (2009.01) |
| *H04W 52/02* | (2009.01) |

(52) U.S. Cl.
CPC ........ *H04L 47/6245* (2013.01); *H04L 47/245* (2013.01); *H04L 47/28* (2013.01); *H04L 47/6275* (2013.01); *H04W 72/1242* (2013.01); *H04L 45/30* (2013.01); *H04L 47/56* (2013.01); *H04W 52/02* (2013.01); *H04W 72/1247* (2013.01); *H04W 88/08* (2013.01)

(58) Field of Classification Search
CPC ... H04L 47/6245; H04L 47/245; H04L 47/28; H04L 47/6275; H04L 47/56; H04W 72/1242; H04W 72/1247; H04W 88/08
See application file for complete search history.

(56) References Cited

U.S. PATENT DOCUMENTS

| | | | |
|---|---|---|---|
| 6,865,185 | B1 | 3/2005 | Patel et al. |
| 7,020,142 | B2 | 3/2006 | Kodaira |
| 7,324,442 | B1 | 1/2008 | Pan et al. |
| 8,300,575 | B2 | 10/2012 | Willars |

(Continued)

OTHER PUBLICATIONS

PCT Search Report and Written Opinion dated Oct. 5, 2018 for PCT application No. PCT/US2018/038607, 11 pages.

(Continued)

*Primary Examiner* — Todd L Barker
(74) *Attorney, Agent, or Firm* — Lee & Hayes, P.C.

(57) ABSTRACT

Techniques directed to servicing communications based on when communication sessions are initialized for nodes are described. For example, a routing device may prioritize packets in a buffer according to when nodes have initiated communication sessions with a service provider or another node. The routing device may give priority to nodes that have first initiated communication sessions. This may avoid communication sessions ending prematurely due to time-out periods and/or avoid delays in completing communication sessions.

20 Claims, 7 Drawing Sheets

(56) References Cited

U.S. PATENT DOCUMENTS

| | | | | |
|---|---|---|---|---|
| 8,391,142 B2* | 3/2013 | Blasinski | | H04W 72/1252 370/230 |
| 9,461,926 B2* | 10/2016 | Orten | | H04W 4/70 |
| 9,632,977 B2 | 4/2017 | Boland et al. | | |
| 10,009,914 B2* | 6/2018 | Velu | | H04W 72/1242 |
| 2003/0212803 A1* | 11/2003 | Wu | | H04L 29/06 709/228 |
| 2004/0208177 A1* | 10/2004 | Ogawa | | H04L 41/0213 370/392 |
| 2005/0201373 A1 | 9/2005 | Shimazu et al. | | |
| 2007/0014289 A1 | 1/2007 | Settle | | |
| 2009/0122699 A1* | 5/2009 | Alperovitch | | H04L 45/00 370/230 |
| 2011/0078248 A1* | 3/2011 | Harpur | | H04L 12/1822 709/206 |
| 2012/0105637 A1* | 5/2012 | Yousefi | | H04N 7/183 348/148 |
| 2012/0144025 A1 | 6/2012 | Melander et al. | | |
| 2012/0166666 A1* | 6/2012 | Tollet | | H04L 63/0245 709/230 |
| 2012/0230345 A1* | 9/2012 | Ovsiannikov | | H04L 47/2441 370/412 |
| 2012/0278464 A1* | 11/2012 | Lehane | | H04L 12/1407 709/223 |
| 2013/0121337 A1* | 5/2013 | Nguyen | | H04W 40/12 370/392 |
| 2014/0077956 A1* | 3/2014 | Sampath | | A61B 5/0022 340/573.1 |
| 2014/0274080 A1* | 9/2014 | Gilbert | | H04W 28/16 455/450 |
| 2014/0297844 A1* | 10/2014 | Kancherla | | H04L 43/0894 709/224 |
| 2015/0244635 A1* | 8/2015 | Orten | | H04W 4/70 370/230 |
| 2016/0021613 A1 | 1/2016 | Mani et al. | | |
| 2017/0003736 A1* | 1/2017 | Turon | | H04L 12/2816 |
| 2017/0026987 A1* | 1/2017 | Velu | | H04W 72/1242 |
| 2017/0093866 A1* | 3/2017 | Ben-Noon | | H04L 9/3234 |
| 2017/0149678 A1* | 5/2017 | Dumitrescu | | H04L 47/623 |
| 2018/0115493 A1* | 4/2018 | Van Leekwijck | | H04L 47/522 |
| 2018/0261020 A1* | 9/2018 | Petousis | | G07C 5/008 |
| 2018/0287640 A1* | 10/2018 | Lin | | H03M 13/3746 |

OTHER PUBLICATIONS

Kim, Ku-Hwan et al., "Infinite Queue Management via Cascade Control for Industrial Routers in Smart Grid IP Networks", Hindawi Publishing Corporation, vol. 2016, Apr. 28, 2016, 11 pages.

* cited by examiner

PACKET SERVICING PRIORITY BASED ON COMMUNICATION INITIALIZATION

BACKGROUND

Client devices often exchange packets with a server during a communication session (e.g., communicating a number of packets over a period of time). In many instances, a packet is sent or received through an intermediary device, such as a router. In downlink scenarios, the server may send packets to the router, and the router forwards the packets on to the client devices. The router stores the packets into a buffer and sends the packets out in a first in, first out manner. The buffer is often filled at a higher rate than it can be serviced. Further, when packets are exchanged during a communication session that is associated with a time-out period, the communication session ends when the time-out period occurs. Since the router is generally not able to service the buffer as quickly as the buffer is filled, and communication sessions are associated with time-out periods, the communication sessions are often ended prematurely before the necessary packets are exchanged to complete the communication sessions. This causes the client devices to restart the communication sessions from the beginning, creating delays in completing communication sessions with a server and creating congestion on a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
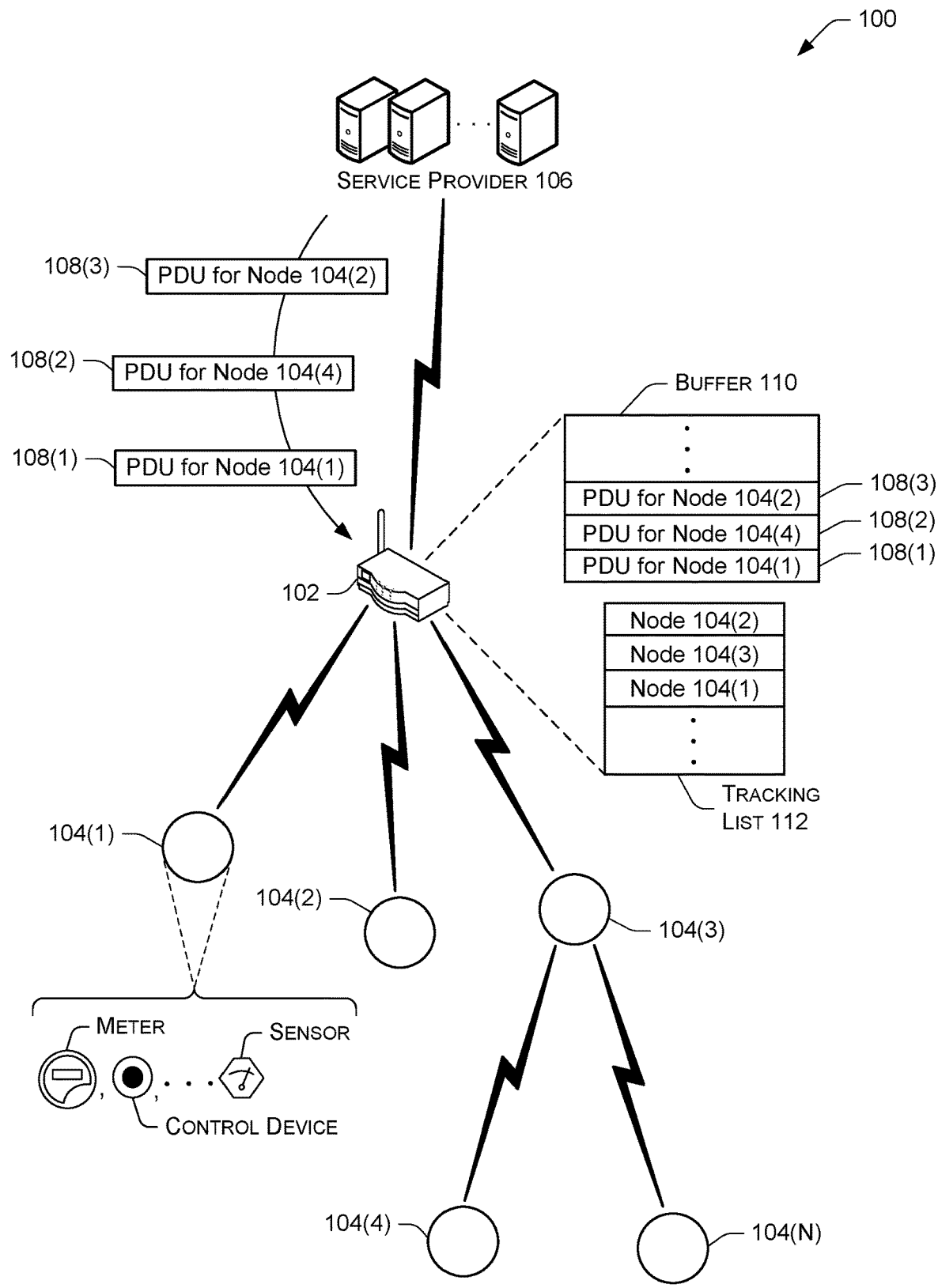
FIG. 1 is a schematic diagram of an example network architecture.

As discussed above, client devices often communicate in sessions with a server through a router. The router implements a buffer to prioritize communication (e.g., servicing the buffer on a first in, first out manner). Since the router is generally not able to service the buffer as quickly as the buffer is filled, and communication sessions are associated with time-out periods, the communication sessions are often ended prematurely before the necessary packets are exchanged.

This disclosure describes techniques directed to servicing communications based on when communication sessions are initialized for nodes (e.g., client devices). For example, a routing device may prioritize packets in a buffer according to when nodes have initiated communication sessions with a service provider or another node. The routing device may give priority to nodes that have first initiated communication sessions. This may avoid communication sessions ending prematurely due to time-out periods and/or avoid delays in completing communication sessions.

To illustrate, a routing device, such as a router, may receive multiple Protocol Data Units (PDUs) from a service provider. Each PDU may comprise a bit, frame, packet, segment, or another unit of data. In many instances, the routing device may store the multiple PDUs in a buffer in the order they are received. Although in other instances, the multiple PDUs may be stored differently. Each PDU may be designated to be sent to a node that is supported by the routing device.

The routing device may service the buffer based on a tracking list that indicates priorities for nodes that are supported by the routing device. The tracking list may include a predetermined number of positions representing different priorities. Each position may include information to indicate that a communication session has started with a node and/or a last time the communication session was serviced (e.g., a last time a PDU was exchanged between the routing device and the node). When servicing the buffer, the routing device may send PDUs in the buffer according to priorities of nodes indicated by the tracking list.

For example, assume that a first node started a communication session with a service provider before a second node started a communication session with the service provider. Here, the tracking list would include information at a first position to indicate that the first node started its communication session and information at a second position to indicate that the second node started its communication session. In this example, the first position indicates that the first node has priority over the second node. Also, assume that the routing device received a PDU destined for the second node, and thereafter, received a PDU destined for the first node. Both PDUs are stored in the buffer in the order they are received. When servicing the buffer, the routing device first searches the buffer for PDUs destined for the first node, since the first node has a higher priority in the tracking list. In this example, the PDU destined for the first node is found and sent to the first node. The routing device then searches the buffer for PDUs destined for the second node, since the second node has a lower priority in the tracking list. In this example, the PDU destined for the second node is found and sent to the second node. As such, the buffer is serviced according to the priorities indicated in the tracking list. This may allow PDUs to be sent in a different order than that which they are received at the routing device.

In many examples, the techniques discussed herein may prioritize communications to complete communication sessions in an efficient manner. For instance, by prioritizing nodes according to when communication sessions are initialized, the techniques may attempt to complete those communication sessions as quickly as possible. This may avoid the communication sessions ending prematurely due to time-out periods and/or avoid delays in completing the communication sessions.

Further, by using a tracking list with a predetermined number of positions, a routing device may focus on completing communication sessions in an organized manner. This may allow the routing device to support many nodes. As one example, a power outage may cause many nodes to reconnect to a service provider at the same time. To do so, each node may initiate an authentication session with the service provider to exchange a number of PDUs. The techniques discussed herein may allow a routing device to prioritize communications from the service provider to the nodes.

The techniques discussed herein may be implemented in a wide variety of contexts. In one example, a routing device supports a number of nodes that are implemented as Battery Powered Devices (BPDs). Here, the techniques may allow the BPDs to complete communication sessions in an efficient manner, which may conserve battery life of the BPDs. Moreover, in contexts where the routing device is a BPD, the techniques may also conserve battery life of the routing device (e.g., by avoiding duplicate transmissions due to restarting communication sessions).

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management, or any other type of wireless or wired network. Unless specifically described to the contrary, the techniques described herein are applicable to any communication network, control network, and/or another type of network or system. In one example, the techniques may be implemented in the context of the Internet of Things (IoT).

In many examples, the techniques describe a routing device that receives a PDU and sends that PDU onto a device. In such examples, sending the PDU that is received may refer to sending a form of the received PDU. In other words, this may include sending control data and/or payload data that is included in the received PDU. As such, a PDU that is sent from a routing device may not include the identical data that is received. In some instances, a routing device may reformat and/or add additional data (e.g., control data) to a received PDU before sending the PDU onto a device.

Example Environment

FIG. 1 is a diagram illustrating an example networked environment or architecture 100. The architecture 100 includes multiple network communication devices. The network communication devices include a routing device 102 and nodes 104(1), 104(2), 104(3), 104(4), . . . 104(N) (collectively referred to as "nodes 104"), where N is any integer greater than or equal to 1. The routing device 102 may generally act as an intermediary between a service provider 106 and the nodes 104. For example, the routing device 102 may receive Protocol Data Units (PDUs) from the service provider 106 and forward those PDUs onto the nodes 104. The routing device 102 may also receive PDUs from the nodes 104 and forward the PDUs onto the service provider 106. A PDU may comprise a bit, frame, packet, segment, or another unit of data. A PDU may include control data and/or payload data. In the example of FIG. 1, the routing device 102 is a parent to the nodes 104 (particularly the nodes 104(1), 104(2), and 104(3)). As such, the nodes 104 represent child nodes. As shown, the nodes 104(1), 104(2), 104(4), and 104(N) represent endpoints/leaf nodes.

A "routing device" may generally comprise any type of network communication device that is configured to receive data that is destined for a device and send the data onto the device. As such, a routing device may act as an intermediary (e.g., a non-endpoint or non-leaf device) to exchange data between devices. Although in some instances, a routing device may comprise a network communication device that sends data to a device without having received the data from another device. In these instances, the data may be generated at the routing device or otherwise formatted or compiled at the routing device.

In the example architecture 100, the routing device 102 comprises a router, such as a field area router (FAR), a cellular router, an edge router, and so on. Although in other examples the routing device 102 comprises another type of network communication device, as discussed in reference to FIG. 2. Further, in the example architecture 100, the routing device 102 is implemented as an edge device, which serves as a connection point of an Area Network (AN) (e.g., a network for the routing device 102 and the nodes 104) to one or more networks (e.g., a backhaul network) connected to the service provider 106, such as the Internet. In other architectures, the routing device 102 may be implemented as any node of a network, such as any of the nodes 104.

The network communication devices of the architecture 100 (e.g., the routing device 102 and the nodes 104) are in communication with one another via an AN. As used herein, the term "area network" (AN) refers to a defined group of devices that are in communication with one another via one or more wired or wireless links. Examples of ANs include, for example, Local Area Networks (LANs), Wide Area Networks (WANs), Neighborhood Area Networks (NANs), Personal Area Networks (PANs), Home Area Networks (HANs), Field Area Networks (FANs), and so on. While only one AN is discussed in reference to FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. The AN may implement a channel hopping sequence, such that a channel may change over time. Although many examples implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN may comprise a mesh network, in which the network communication devices relay data through the AN. Alternatively, or additionally, the AN may comprise a star network, in which a central device acts a parent to one or more children devices. Further, in some instances the AN may include a portion that is implemented as a mesh network and a portion that is implemented as a star network. Moreover, in other instances the AN may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN, individual network communication devices may communicate by wireless (e.g., radio frequency) and/or wired (e.g., power line communication, Ethernet, serial, etc.) connections.

The service provider 106 may provide remote resources to the network communication devices. In some instances, the service provider 106 comprise one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. The network communication devices may register or interact with some or all of these one or more central office systems. In one example, the one or more central office systems may implement a meter data management system to collect resource consumption data (e.g., data regarding usage of water, gas, electricity, etc. at a meter) from the network communication devices of the AN, process the resource consumption data, provide data regarding resource consumption to customers, utilities, and others, and/or perform a variety of other functionality. In other instances, the service provider 106 comprises other systems to implement other functionality, such as web services, cloud services, and so on. In yet other instances, the service provider 106 may be implemented as other types of devices, such as in the context of the Internet of Things (IoT) that allows a variety of devices to exchange data.

In one example, the service provider 106 facilitates a communication session with one or more of the nodes 104. For example, the node 104(1) may initiate an authentication session with the service provider 106 to exchange a number of packets associated with authenticating the node 104(1) to the service provider 106. The node 104(1) may have experienced a power outage or another event and restarted to begin the authentication process. During the authentication session, a variety of data may be exchanged between the service provider 106 and the node 104(1), such as a request to identify a device (e.g., the node 104(1)), a response to identify the device, a request to start, a response to start, one or more certificates, one or more authentication or encryption keys, and so on. In one example, around twenty-five packets are exchanged during the authentication session. Although any number of packets may be exchanged.

The service provider 106 may be physically located in a single central location, or may be distributed at multiple different locations. The service provider 106 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

As illustrated in the example of FIG. 1, the routing device 102 receives a plurality of PDUs 108(1), 108(2), and 108(3) (collectively referred to as "PDUs 108") from the service provider 106. The plurality of PDUs 108 may be received at the same time or over a period of time. The PDU 108(1) is received first, then the PDU 108(2) is received, and then the PDU 108(3) is received. As shown, the PDU 108(1) is destined for the node 104(1), the PDU 108(2) is destined for the node 104(4), and the PDU 108(3) is destined for the node 104(2). The routing device 102 stores the plurality of PDUs 108 in a buffer 110 in the order in which they are received. Here, the bottom of the buffer 110 represents the first PDU that is received, and in this example, the first PDU that is queued to be sent out.

The routing device 102 may service the buffer 110 based on a tracking list 112 that indicates priorities of nodes. A "tracking list" may include information regarding one or more communication sessions that are initiated for one or more nodes. A tracking list may include a predetermined number of positions, with each position including information about a communication session. For instance, a top position in a tracking list may include information about a communication session that started first, while a bottom position in the tracking list may include information about a communication session that started last (e.g., a most recently started communication session). Each position in a tracking list represents a level of priority for a node. In one example, a top position may be given the highest priority for communication, a next position down may be given the next highest priority for communication, and a bottom position may be given the lowest priority for communication. In other examples, a tracking list may be ordered differently (e.g., a bottom position may be associated with a highest priority). In instances where a tracking list includes a highest priority position at a top, information may be added to a bottommost unoccupied position of the tracking list when a communication session is initiated. Conversely, where a tracking list includes a highest priority position at a bottom, information may be added to a topmost unoccupied position of the tracking list when a communication session is initiated.

As noted above, each position in a tracking list may include information about a communication session with a node. Such information may include a service value indicating a last time a PDU was exchanged for a communication session and/or an address value indicating an address of a node associated with the communication session. In some instances, the service value includes a monotonically increasing value to indicate a last time of servicing a PDU to a node, while in other instances the service value includes a time stamp of a last servicing of a PDU to a node. To illustrate, for a node that has initiated a communication session with a service provider, a tracking list may include information for the communication session between the node and the service provider. The information may include a service value indicating that a routing device last sent a PDU to the node 1 hour ago and may include an address of the node (e.g., a destination address for the communication session).

In the example of FIG. 1, the tracking list 112 shows the node 104(2) at a top position to indicate that this node initiated a communication session with the service provider 106 first. The tracking list 112 also includes the node 104(3) at the next position to indicate that this node initiated a communication session next, and the node 104(1) at the next position to indicate that this node initiated a communication next. When a node has completed a communication session, the node (e.g., information about the communication session) may be removed from the tracking list. For example, when the node 104(2) has exchanged the necessary packets with the service provider 106 to complete an authentication session (e.g., has successfully authenticated to the service provider 106), information about the node 104(2) will be removed from the tracking list 112.

When servicing the buffer 110, the routing device 102 prioritizes communications based on the tracking list 112. In this example, a node at the top of the tracking list 112 is given the highest priority. In particular, the routing device 102 first identifies that the node 104(2) is at the top of the tracking list 112. The routing device 102 then searches the buffer 110 for any PDUs destined for the node 104(2). Here, the PDU 108(3) is identified, which is third in the buffer 110. The PDU 108(3) is then reprioritized within the buffer 110 so that the PDU 108(3) is sent first. Next, the routing device 102 identifies the node 104(3) as next in the tracking list 112, and searches the buffer 110 for any PDUs destined for the node 104(3). Here, the buffer 110 does not include any PDUs for the node 104(3), and thus, no PDUs are sent to the node 104(3). Next, the routing device 102 identifies the node 104(1) as next in the tracking list 112, and searches the buffer 110 for any PDUs that are destined for the node 104(1). Here, the PDU 108(1) is found and prioritized within the buffer 110 so that the PDU 108(1) is sent next. This process may continue until the routing device 102 has made its way through the entire tracking list 112.

Although in many instances the techniques are discussed in the context of a tracking list that includes information about a destination node, in some instances the techniques may be applied to a source node. For instance, a tracking list may store an address value indicating an address of a source node associated with a communication session and/or a service value indicating a last time a PDU was sent to or received from the source node. The address value may be a source address indicating where a PDU originates or comes from (e.g., a node that sent the PDU).

Furthermore, although the example of in FIG. 1 includes the routing device 102 implemented as an edge node, any of the nodes 104 may act as a "routing device" to perform similar techniques. For example, the node 104(3) may act as a routing device to support the nodes 104(4) and 104(N).

The techniques are discussed in many instances as being performed by a device that is one hop away from a destination node. In one example, the routing device 102 may maintain a tracking list for prioritizing communications destined to the node 104(2) that is one hop away. In another example, the node 104(3) may maintain a tracking list for prioritizing communications destined to the node 104(N) that is one hop away. However, in other instances the techniques may be performed by other devices. In one example, the routing device 102 may maintain a tracking list for prioritizing communications destined to the node 104(N) that is multiple hops away.

Example Network Communication Devices

Figure 2:
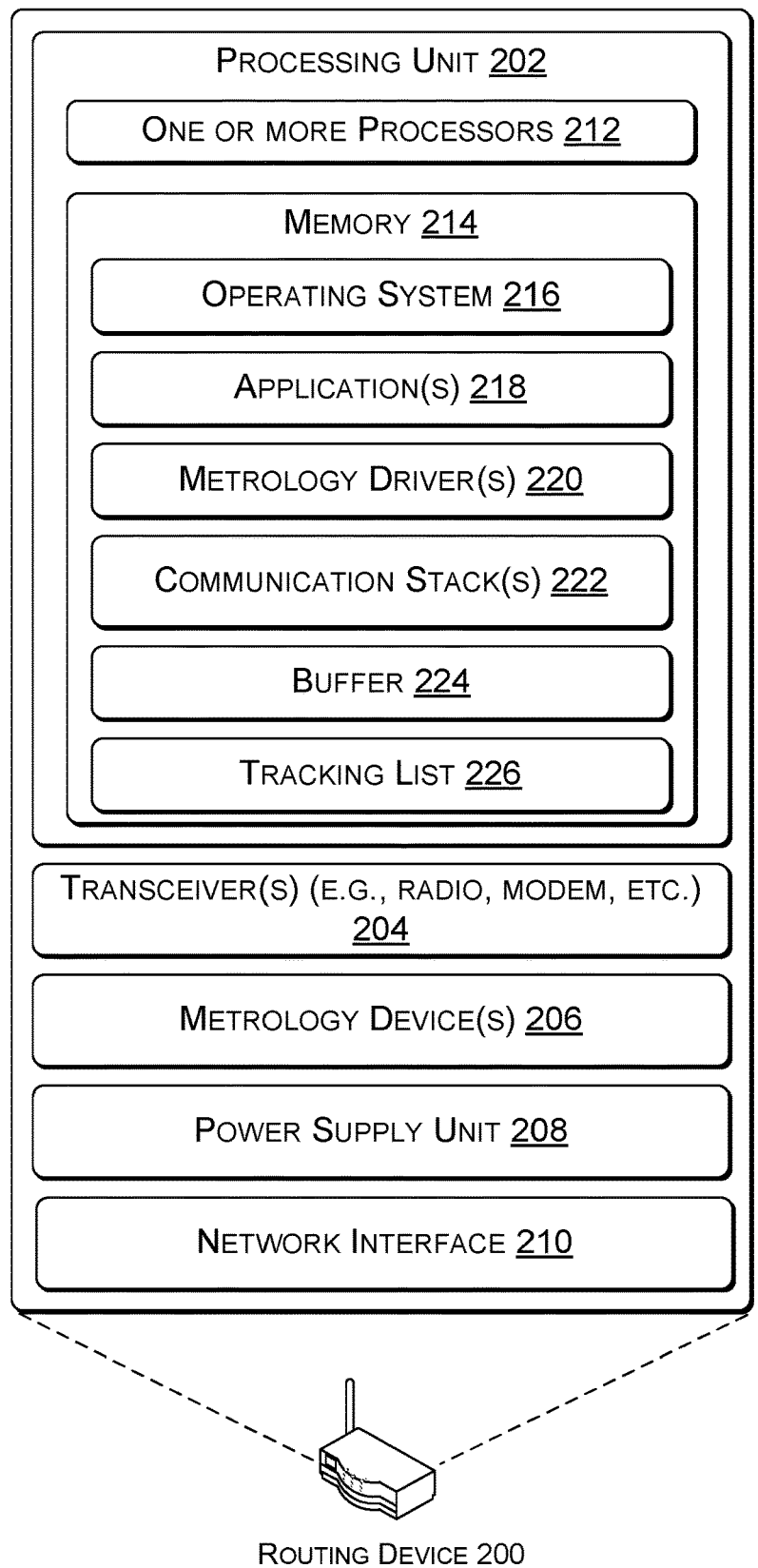
FIG. 2 is a diagram showing details of an example routing device.

FIG. 2 is a diagram showing details of an example routing device 200, such as the routing device 102 of FIG. 1. The routing device 200 may comprise any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, a computer systems in an automobile (e.g., navigation system), a camera, a robot, a hologram system, a security system, a home-based computer system (e.g., an intercom system, a home media system, etc.), a projector, an automated teller machine (ATM), and so on. In some examples, the routing device 200 is implemented as an edge device, such as a FAR, a cellular relay, a cellular router, an edge router, a DODAG (Destination Oriented Directed Acyclic Graph) root, a root device or node of an AN, and so on.

In some instances, the routing device 200 comprises a Full Function Device (FFD), while in other instances the routing device comprises a Limited Function Device (LFD). An FFD may include more functionality/resources than an LFD, such as different processing powers, processing capabilities, power reliance, etc. In one example, an FFD is implemented as Mains Powered Device (MPD) that is connected to mains electricity (e.g., electricity meters), while an LFD is implemented as Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life.

In one example of the architecture 100 of FIG. 1, the routing device 102 comprises an FFD and the nodes 104 comprise one or more LFDs and/or FFDs. In another example, the routing device 102 comprises an LFD and the nodes 104 comprise one or more LFDs and/or FFDs.

As shown in FIG. 2, the example routing device 200 includes a processing unit 202, a transceiver 204 (e.g., radio), one or more metrology devices 206, a power supply unit 208, and a network interface 210. The processing unit 202 may include one or more processors 212 and memory 214. The one or more processors 212 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver 204 may comprise one or more hardware and/or software implemented radios to provide two-way RF communication with other network communication devices in an AN or another network. The transceiver 204 may additionally or alternatively include a modem to provide power line communication (PLC) communication with other network communication devices that are connected to an electrical service grid.

The metrology device(s) 206 may comprise the physical hardware and sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver 204 and/or the network interface 210. The consumption data may be formatted and/or packetized in a manner or protocol for transmission.

The power supply unit 208 may provide power to the routing device 200. In some instances, such as when the routing device 200 is implemented as a FFD, the power supply unit 208 comprises a mains power connector that couples to an Alternating Current (AC) or Direct Current (DC) mains power line where the routing device 200 is installed. In other instances, such as when the routing device 200 is implemented as a LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 214 includes an operating system (OS) 216 and one or more applications 218 that are executable by the one or more processors 212. The memory 214 may also include one or more metrology drivers 220 configured to receive, interpret, and/or otherwise process metrology data collected by the metrology device(s) 206. Additionally, or alternatively, the one or more applications 218 may be configured to receive and/or act on data collected by the metrology device(s) 206.

The memory 214 may also include one or more communication stacks 222. In some examples, the communication stack(s) 222 may be configured to implement a 6LowPAN protocol, an 802.15.4e (TDMA CSM/CA) protocol, an 802.15.4-2015 protocol, and/or another protocol. However, in other examples, other protocols may be used, depending on the networks with which the routing device 200 is intended to be compatible. The communication stack(s) 222 describe the functionality and rules governing how the routing device 200 interacts with each of the specified types of networks. For instance, the communication stack(s) 222 may cause network communication devices to operate in ways that minimize the battery consumption of the network communication devices when they are connected to these types of networks.

In some instances, the routing device 200 may be configured to send or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

The memory 214 also includes a buffer 224 to store data (e.g., PDUs) that are queued to be sent out. As noted above, in many instances the buffer 224 stores data in the order in which the data is received. The buffer 224 may generally comprise a first in, first out buffer. Although other types of buffers may be implemented, such as a last in, first out buffer.

Further, the memory 214 includes a tracking list 226 that includes information regarding one or more communication sessions that are initiated for one or more nodes. The tracking list 226 may include a predetermined number of positions, with each position including information about a communication session. In some instances, the tracking list 226 is implemented as an array of a predetermined length (e.g., with a predetermined number of positions/elements). In other instances, the tracking list 226 is implemented in other manners, such as a list, etc.

Figure 3:
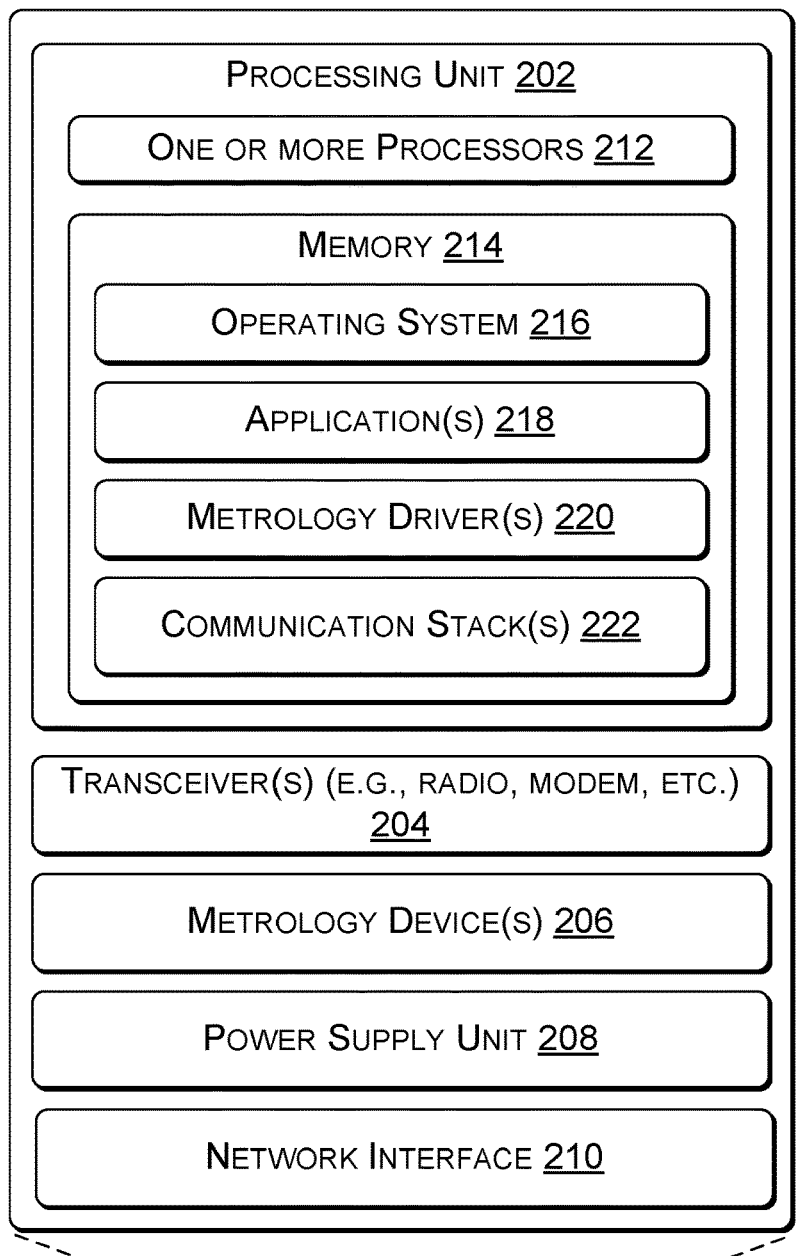
FIG. 3 is a diagram showing details of an example node.

FIG. 3 is a diagram showing details of an example node 300, such as one of the nodes 104 of FIG. 1. The node 300 may comprise any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, a computer systems in an automobile (e.g., navigation system), a camera, a robot, a hologram system, a security system, a home-based computer system (e.g., an intercom system, a home media system, etc.), a projector, an automated teller machine (ATM), and so on. In some instances, the node 300 comprises a Limited Function Device (LFD), while in other instances the node 300 comprises a Full Function Device (FFD).

The node 300 of FIG. 2 is similar in many respects to the routing device 200 of FIG. 3. To the extent that the routing device 200 and node 300 include the same or similar components, the functions will not be repeated here. Therefore, the following discussion of the node 300 focuses on the differences between the node 300 and the routing device 200. However, the differences highlighted below should not be considered to be exhaustive.

One difference between the node 300 and the routing device 200 is that the node 300 does not include the buffer 224 or the tracking list 226. Also, in some examples, even components with similar functions may be different for the node 300 than for the routing device 200 due to the different constraints. As one example, while both the routing device 200 and the node 300 have transceivers, the specific transceivers used may be different. For instance, when the routing device 200 comprises an FFD and the node 300 comprises an LFD, a transceiver on the routing device 200 may include a PLC modem, while a transceiver on the node 300 does not because the node 300 is not connected to an electrical power line that could be used for PLC communications. Additionally, or alternatively, a transceiver on the node 300 may employ a lower power RF radio than the routing device 200 to minimize energy consumption. Further, other components of the routing device 200 and the node 300 may vary. In some instances, the node 300 is implemented with less functionality and/or include less hardware components than the routing device 300. Further, in some instances components of the node 300 are lower power components than the corresponding components of the routing device 200.

The memory 214 of the routing device 200 and/or the node 300 may include software functionality configured as one or more "modules." The modules are intended to represent example divisions of the software for purposes of discussion, and are not intended to represent any type of requirement or required method, manner or necessary organization. Accordingly, while various "modules" may be implemented, their functionality and/or similar functionality could be arranged differently (e.g., combined into a fewer number of modules, broken into a larger number of modules, etc.).

The various memories described herein (e.g., the memory 214) are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices (e.g., the routing device 200 and the node 300) are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing.

By way of example and not limitation, the routing device 200 and/or the node 300 may implement a variety of modulation techniques and/or data rates, such as frequency-shift keying (FSK) 802.15.4g (e.g., mandatory mode with a data rate of 50 kbps or 75 kbps, no forward error correction; legacy mode with a data rate of 150 kbps with forward error correction code rate ½; option 2; etc.), offset quadrature phase-shift keying (OQPSK) modulation with direct-sequence spread spectrum (DSSS) spreading, and so on. To implement these different connection modes, a media access control (MAC) sub-layer of a device may be able to indicate to a physical layer the modulation technique and data rate to be used for each transmission.

Example Processes

FIGS. 4, 5, 6, and 7 illustrate example processes 400, 500, 600, and 700, respectively, for employing the techniques discussed herein. For ease of illustration the processes 400, 500, 600, and 700 may be described as being performed by a network communication device described herein, such as the routing device 200 and/or the node 300. However, the processes 400, 500, 600, and 700 may be performed by other network communication devices. Moreover, the network communication devices may be used to perform other processes.

The processes 400, 500, 600, and 700 (as well as each process described herein) are illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

Figure 4:
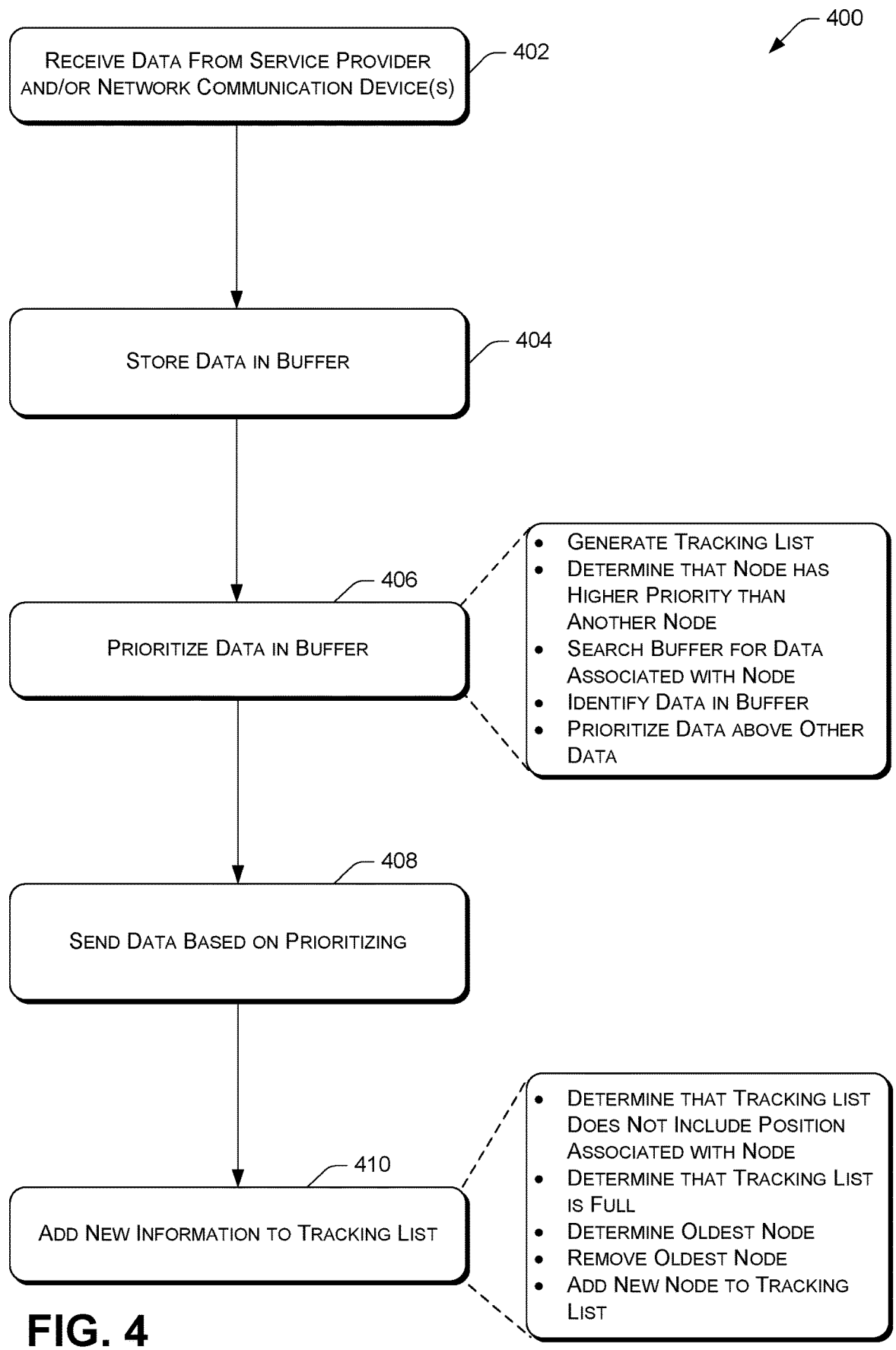
FIG. 4 illustrates an example process to service communications based on when communication sessions are initialized for nodes.

FIG. 4 illustrates the example process 400 to service communications based on when communication sessions are initialized for nodes.

At 402, the routing device 200 may receive data from a service provider and/or one or more network communication devices. For example, the routing device 200 may receive first data designated to be sent to a first node and receive second data designated to be sent to a second node. The first data and the second data may be received in a particular order (e.g., the second data is received after the first data). "Data" may refer to a Protocol Data Unit (PDU) or data within a PDU, such as payload or control data. In some instances, data is received from a service provider over a wired or wireless connection, while in other instances the data is received from a node over a wireless or wired connection. As such, in some instances data may be received from a device that is within wireless communication range of the routing device 200 (e.g., within a predetermined distance to the routing device 200). Further, in some instances the routing device 200 comprises a Mains Powered Device (MPD), while in other instances the routing device 200 comprises a Battery Powered Device (BPD).

In some examples, data that is received at 402 is associated with an authentication session. An authentication session may include exchanging a number of data units (i.e., PDUs) with a service provider or a network communication device to authenticate to the service provider or network communication device. In other examples, data that is received at 402 may be received for another type of communication session.

At 404, the routing device 200 may store data received at 402 in a buffer. The routing device 200 may store the data in the order it is received. For example, first data (e.g., PDU) may be stored in the buffer at the top of the buffer (e.g., highest priority position) and second data may be stored in the next position down when the second data is received right after the first data. The routing device 200 may process the buffer in a first in, first out manner; a last in, first out manner; or any other manner.

At 406, the routing device 200 may prioritize data in the buffer. For example, if the buffer includes first data destined for a first node and second data destined for a second node, the routing device 200 may prioritize the first data and the second data in the buffer according to when a first communication session was initiated for the first node and when a second communication session was initiated for the second node. In some instances, a communication session is initiated by a node, while in other instances a communication session is initiated by a service provider.

In one illustration of prioritizing data at 406, the routing device 200 may generate (e.g., create, fill, add to, etc.) a tracking list including a plurality of positions representing priorities, respectively. For example, the tracking list may include a first position and a second position, with the first position having a higher priority than the second position.

Each position in the tracking list may include information regarding a communication session, such as a service value indicating a last time of communication from the routing device 200 to a node for a communication session and/or an address value indicating an address of a node associated with the communication session (e.g., a destination or source address). The tracking list may include a predetermined number of positions. When a communication session is initialized (e.g., when a communication is first sent for the communication session), a new entry may be added to the tracking list.

In any event, the routing device 200 may use the tracking list to determine that a node has a higher priority than another node. In returning to the example above where the first position has a higher priority than the second position in the tracking list, the routing device 200 may determine that a node associated with the first position has a higher priority than a node associated with the second position. The routing device 200 may then search the buffer for data that is designated to be sent to the node with the higher priority. If data is identified in the buffer from the searching, the routing device 200 may prioritize that data (e.g., reposition the data in the highest priority position in the buffer to be sent out from the routing device 200). As such, the routing device 200 may prioritize data above other data in the buffer based on the data being associated with an earlier initialization of a communication session.

At 408, the routing device 200 may send (e.g., transmit) data based on the prioritizing at 406. For example, if first data is prioritized higher than second data at 406, due to the first data being destined for a node that is listed higher in a tracking list, the routing device 200 may send the first data before sending the second data. As such, the routing device 200 may send data from the buffer out of order from that which it was received at the routing device 200.

In some instances, the routing device 200 may update information in a tracking list to indicate that data has been sent. To illustrate, if the routing device 200 sends data to a node for a communication session, the routing device 200 may update information at a position in the tracking list that is associated with the communication session. In particular, a service value for the communication session may be updated to indicate the time when the data was sent.

In some instances, the routing device 200 sends data to a Battery Powered Device (BPD), such as a BPD endpoint that is communicatively coupled to a utility meter. The BPD may be configured to enter a sleep state and an active state based on a communication schedule. The routing device 200 may also have access to the communication schedule to determine when the BPD is in the active state (e.g., awake). Thus, the routing device 200 may send data to the BPD when the BPD is in the active state.

In many instances, the operations of prioritizing data (406) and sending data based on the prioritizing (408) may be performed any number of times until the buffer has been searched for all data (or a predetermined number of PDUs) destined to nodes listed in the tracking list. The routing device 200 may start with the node positioned in the tracking list at the highest priority and proceed in decreasing order of priority through the tracking list. If data still remains in the buffer (or no data is found in the buffer for a node in the tracking list), the process 400 may proceed to 410.

At 410, the routing device 200 may add new information to the tracking list. In particular, the routing device 200 may add information to the tracking list regarding a new communication session that is not currently represented in the tracking list. If the tracking list includes an open (unoccupied) position, the routing device 200 may add the information to the open position (a least priority position). Alternatively, if the tracking list is full (e.g., all positions are occupied), the routing device 200 may remove information about an oldest serviced node and add the information about the new communication session to the tracking list.

To illustrate, assume that a tracking list includes a number of positions that are all occupied. Also, assume that there is currently no data in a buffer that is destined for a node listed in the tracking list, but there is data in the buffer for a new node that is not yet listed in the tracking list (e.g., the new node just started a communication session). Here, when servicing the buffer, the routing device 200 may determine that the tracking list does not include a position associated with the new node. The routing device 200 may also determine that each of the positions in the tracking list are occupied. Based on such determinations, the routing device 200 may identify a node that is currently listed in the tracking list that is the oldest serviced node. This is the node that will be removed from the tracking list. To do so, the routing device 200 may determine that a most recent communication to a node listed in the tracking list occurred longer ago than a most recent communication from each of the nodes in the tracking list. The routing device 200 may then remove information for the node (e.g., the oldest serviced node) from the tracking list. The routing device 200 may add information for the new node to the tracking list. The new node may be added at a position in the tracking list having the least priority (e.g., at the bottom of the tracking list). Here, other nodes in the tracking list may be repositioned to higher priority positions before adding the new node to the tracking list. The other nodes may be repositioned to fill an empty space left by the oldest serviced node and open a position with the least priority for the new node. Once the new node is listed in the tracking list, data in the buffer that is destined for the new node may be prioritized to be sent.

As noted above, in some instances operation 410 may be performed if no data is found in a buffer for a node listed in a tracking list. Here, operation 408 may be performed after operation 410. In other words, operation 408 may be performed after adding new information to the tracking list for a new node, so that data in the buffer that is destined for the new node is sent to the new node after adding it to the tracking list.

Although many example techniques are discussed in the context of reprioritizing data within a buffer when the buffer is being serviced, in some examples the buffer may be reordered (based on a tracking list) each time new data is added to the buffer. For example, at a time when data is received that is destined for a highest priority node in a tracking list, the buffer may be reordered and the data may be inserted into a highest priority position in the buffer. As such, data may be intelligently positioned in a buffer based on a tracking list.

Figure 5:
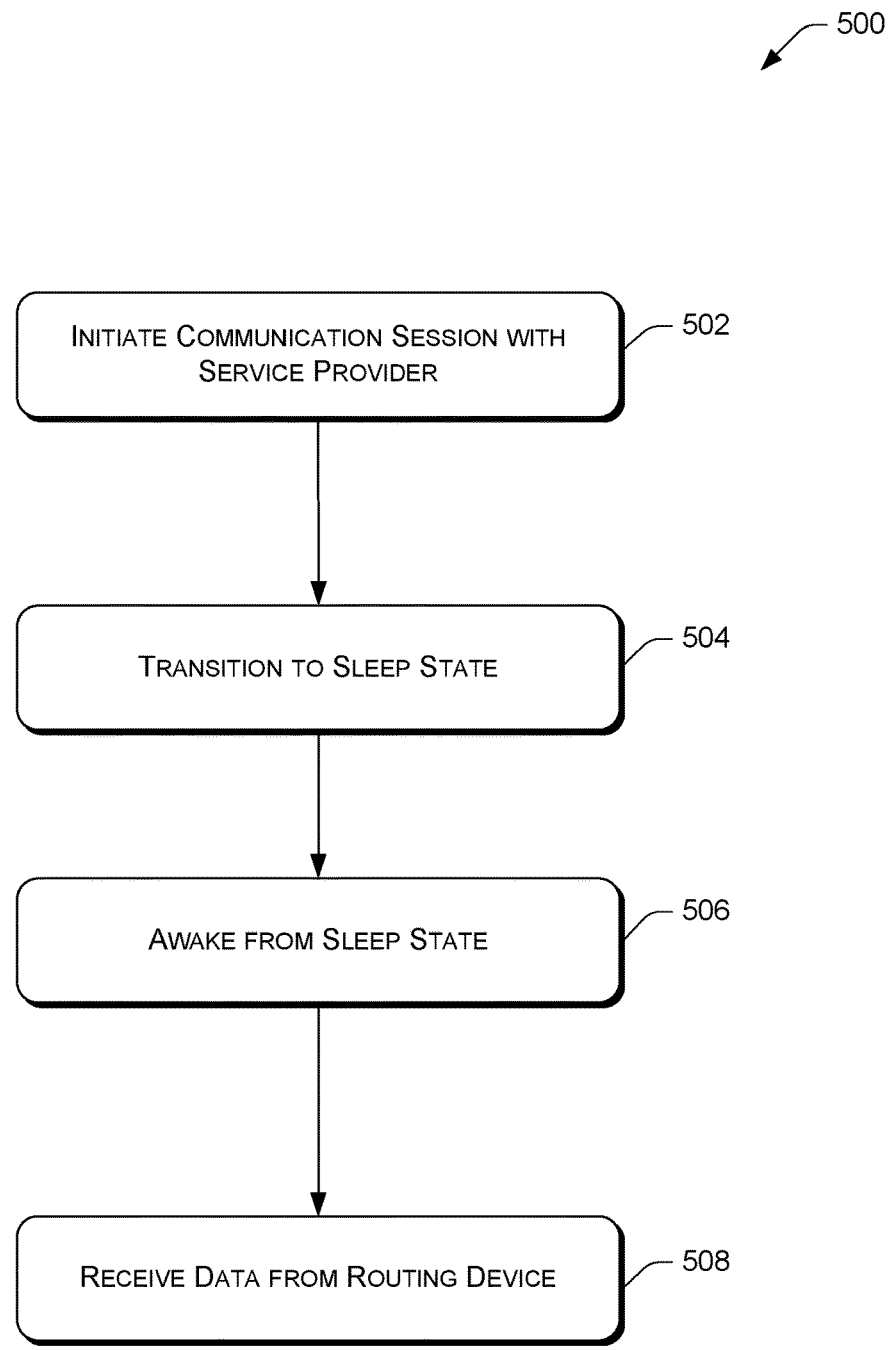
FIG. 5 illustrates an example process to facilitate a communication session with a Battery Powered Device (BPD).

FIG. 5 illustrates the example process 500 to facilitate a communication session with a Battery Powered Device (BPD). The example process 500 is discussed as being performed by the node 300 that is implemented as a BPD.

At 502, the node 300 may initiate a communication session with a service provider. For example, the node 300 may send data (e.g., a message) to a routing device to be sent onto the service provider to begin an authentication session with the service provider.

At 504, the node 300 may transition to a sleep state. This may allow the node 300 to conserve power resources, such as battery life of the BPD. Operation 504 may be based on a communication schedule associated with the routing device (e.g., knowing that the routing device is not planning to communicate with the node 300 for a period of time). The communication schedule may indicate one or more windows of time for communication between the node 300 and the routing device.

At 506, the node 300 may awake from the sleep state to an active state. This may be based on the communication schedule associated with the routing device. For example, the node 300 may awake when a communication is expected from the routing device.

At 508, the node 300 may receive data from the routing device while the node 300 is in the active state. In some instances, the data is received wirelessly, while in other instances the data is received over a wired connection.

Figure 6:
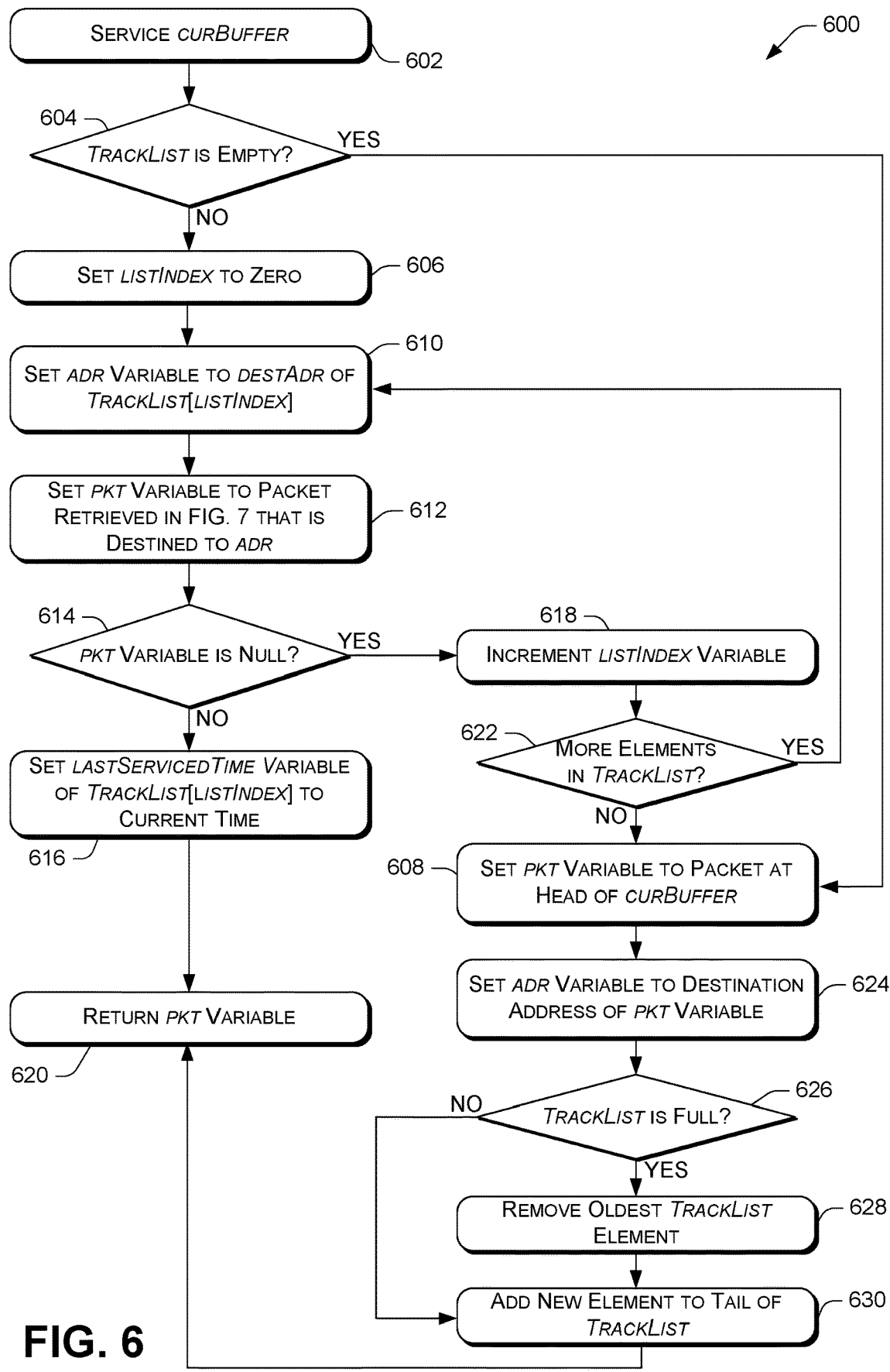
FIG. 6 illustrates an example process to service a buffer based on a tracking list.

FIG. 6 illustrates an example process 600 to service a buffer based on a tracking list.

In the example process 600, the tracking list (also referred to as "TrackList") includes an array having a length defined by a variable "TrackListSize." Here, the elements in the array have different buffer servicing priority depending on their index inside the array. The element at the head of the TrackList (of index zero—TrackList[0]) has the highest servicing priority. The element at the tail of the TrackList (of index TrackListSize-1—TrackList[TrackListSize-1]) has the lowest servicing priority. Each element has the following attributes: (i) an address variable (also referred to as "destAdr") indicating a destination address of a Battery Powered Device (BPD) and (ii) a service variable (also referred to as "lastServicedTime") indicating the last time when a packet destined to the destAdr was serviced. In many instances, the lastServicedTime values are monotonically increasing values. Thus, the oldest element is the element with the least or smallest value.

A "listIndex" variable maintains the index to the TrackList elements. This variable has a range from zero to the TrackListSize. Further, "curBuffer" is a buffer used to store packets that are queued to be sent out from the routing device 200.

At 602, the routing device 200 services the curBuffer. This servicing may occur when the routing device 200 determines that it's time to send communications to one or more BPDs that are within communication range of the routing device 200.

At 604, the routing device 200 determines if the TrackList is empty (e.g., if there are any elements in the TrackList). If the TrackList is not empty, the process 600 may proceed to operation 606 (e.g., the "NO" branch). Alternatively, if the TrackList is empty, the process 600 may proceed to operation 608 (e.g., the "YES" branch).

At 606, the routing device 606 sets the listIndex to zero. This may allow the packet with highest servicing priority in the buffer to be serviced first.

At 610, the routing device 200 sets an "adr" variable to the destAdr of the TrackList at the index defined by listIndex. In other words, the routing device 200 sets adr to destAdr of TrackList[listIndex]).

At 612, the routing device 200 sets a "pkt" variable to a packet retrieved by a process 700 that is destined to adr.

At 614, the routing device 200 determines if the pkt variable is set to null following the performance of operation 612. If the pkt variable is not set to null (meaning that operation 612 found a packet in the curBuffer that is destined to the selected element of the TrackList indexed by listIndex), the process 600 proceeds to operation 616 (e.g., the "NO" branch). Alternatively, if the pkt variable is set to null (meaning that there are no packets in the curBuffer that are destined to the selected element of the TrackList indexed by listIndex), the process 600 proceeds to operation 618 (e.g., the "YES" branch).

At 616, the routing device 200 sets the lastServiceTime variable of the TrackList at the index defined by listIndex (TrackList[listIndex]) to the current time.

At 620, the routing device 200 returns the pkt variable, so that the packet pointed to by the pkt variable is sent out to the appropriate node.

At 618, the routing device 200 increments the listIndex variable by one. Operation 618 is generally performed when the currently selected element of TrackList has no packets in the curBuffer. As such, the listIndex variable is incremented to search for a packet in the curBuffer having the next highest priority.

At 622, the routing device 200 determines if more elements are included in the TrackList. If there are more elements in the TrackList (e.g., there is an element in the TrackList at the new listIndex), the process 600 may proceed back to operation 610 (e.g., the "YES" branch) to perform operation 610 for a next highest priority element in the TrackList. Alternatively, if there are no more elements in the TrackList, the process 600 may proceed to operation 608 (e.g., the "NO" branch). This branch may be taken when, for example, the process 600 has checked all elements of TrackList.

At 608, the routing device 200 sets the pkt variable to the packet at the head of the curBuffer. In many instances, operation 608 is performed when none of the TrackList elements have packets in the curBuffer or when the TrackList is empty.

At 624, the routing device 200 sets the adr variable to the destination address of the pkt variable (e.g., destination address of the packet at the head of the curBuffer).

The process 600 may then add a new element to the TrackList (in the following operations), since the routing device 200 has not yet serviced the destination address of the pkt variable (e.g., the destination address is not yet tracked by the TrackList).

At 626, the routing device 200 determines if the TrackList is full. If the TrackList if full, the process 600 proceeds to operation 628 (e.g., the "YES" branch). Alternatively, if the TrackList is not full, the process 600 proceeds to operation 630 (e.g., the "NO" branch).

At 628, the routing device 200 removes the oldest TrackList element. The oldest TrackList element comprises the element with the least lastServicedTime value. In other words, the oldest TrackList element is the element that was serviced the longest time ago from among the elements in the TrackList. For example, if a particular node in the TrackList was last serviced two hours ago and all other nodes in the TrackList were serviced in the last few minutes, the particular node would be removed since it is the oldest TrackList element.

At 630, the routing device 200 adds a new element to the tail of the TrackList (e.g., the lowest priority position among the empty positions in the array). For example, if a size of the TrackList is 4, the new element may be added to position 3 in the TrackList if positions 0 and 2 are occupied. The new element includes a destAdr attribute that is set to the destination address of the pkt variable (adr) and a lastServicedTime attribute that is set to the current time. In other words, the new element includes information regarding the packet at the head of the curBuffer.

The process 600 may then proceed to operation 620 to return the pkt variable (e.g., prioritize the packet in the pkt variable as the highest priority for sending).

Figure 7:
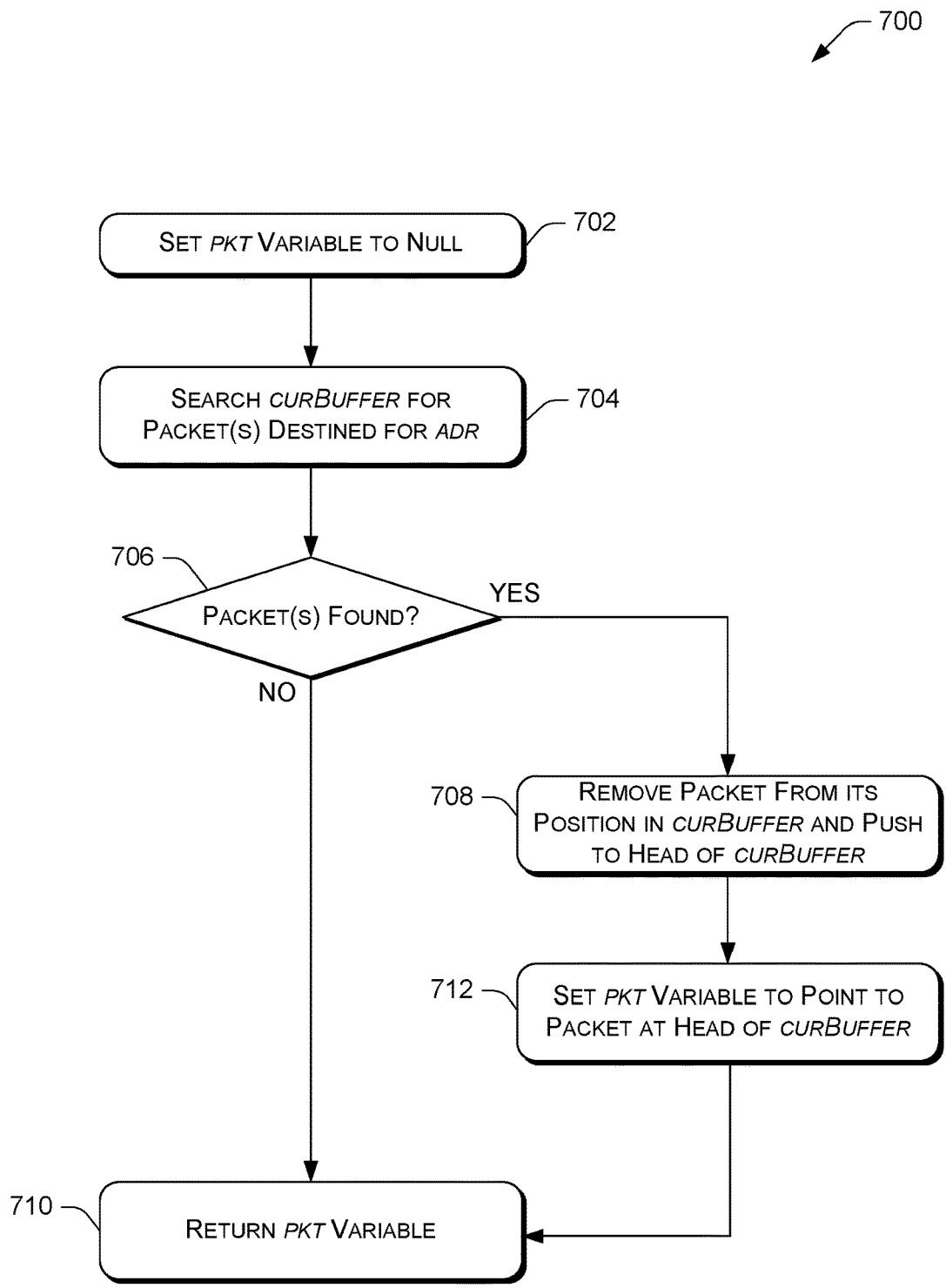
FIG. 7 illustrates an example process to retrieve a packet.

FIG. 7 illustrates the example process 700 to retrieve a packet. In many instances the process 700 may be performed at operation 612 of FIG. 6. Although the process 700 may be performed at other times.

At 702, the routing device 200 sets the pkt variable to null.

At 704, the routing device 200 searches the curBuffer for a packet(s) destined for the address identified by the adr variable. The adr variable may have been set in FIG. 6. Operation 704 may include a linear search that starts with a packet at the head of the curBuffer. The search may end when a packet that has a destination address that matches the adr variable is found (e.g., first occurrence). Otherwise, the search continues until reaching the tail of the curBuffer.

At 706, the routing device 200 determines if a packet(s) is found at 704. If a packet(s) is found, the process 700 may proceed to 708 (e.g., the "YES" branch). If a packet(s) is not found, the process 700 may proceed to 710 (e.g., the "NO" branch).

At 708, the routing device 200 may remove the packet(s) that is found from its position in the curBuffer and push the packet(s) to the head of the curBuffer.

At 712, the routing device 200 sets the pkt variable to point to the packet at the head of the curBuffer.

At 710, the routing device 200 returns the pkt variable (e.g., the packet identified by the pkt variable). When a packet is found, the pkt variable points to the found packet. However, when a packet is not found, the pkt variable is null.

What is claimed is:

1. A method comprising:
   receiving, by a router, a first Protocol Data Unit (PDU) designated to be sent to a first node, the first PDU being associated with a first communication session;
   receiving, by the router, a second PDU designated to be sent to a second node, the second PDU being associated with a second communication session;
   storing, by the router, the second PDU in a buffer;
   storing, by the router, the first PDU in the buffer;
   generating, by the router, a tracking list indicating that the second communication session associated with the second node was initiated before the first communication session associated with the first node, the tracking list including a predetermined number of positions representing a corresponding number of priorities prioritizing nodes that are supported by the router;
   determining that the predetermined number of positions of the tracking list are full;
   in response to determining that the predetermined number of positions of the tracking list are full:
      determining that no data exists in the buffer;
      in response to determining that no data exists in the buffer:
         removing first information associated with an oldest serviced node from the tracking list, the oldest serviced node being a service node from the tracking list with which it has been longest since the router has received communication;
         adding second information associated with the first node to the tracking list;
         adding the first PDU associated with the first node to the buffer; and
         prioritizing the first PDU in the buffer.

2. The method of claim 1, further comprising:
   determining, by the router, that the second node has a higher priority than the first node based at least in part on priority indicated by the tracking list;
   searching the buffer for the second PDU that is designated to be sent to the second node based on the priority indicated by the tracking list; and
   sending, by the router, the second PDU to the second node based at least in part on the priority indicated by the tracking list,
   wherein:
      the receiving the second PDU comprises receiving the second PDU after receiving the first PDU; and
      the storing comprises storing the first PDU in the buffer before storing the second PDU in the buffer.

3. The method of claim 2, wherein acts further comprise:
   identifying the second PDU in the buffer based at least in part on the searching; and
   prioritizing the second PDU higher in the buffer than the first PDU.

4. The method of claim 2, wherein:
   the first node and the second node comprise a battery powered device configured to enter a sleep state and an active state based at least in part on a communication schedule; and
   the sending comprises sending the second PDU to the second node based at least in part on determining that the second node is in the active state.

5. A routing device comprising:
   one or more processors; and
   memory communicatively coupled to the one or more processors, the memory storing one or more instructions that, when executed by the one or more processors, cause the one or more processors to perform operations comprising:
      receiving first data designated to be sent to a first node;
      receiving second data designated to be sent to a second node;
      storing the first data and the second data in a buffer;
      prioritizing the first data and the second data in the buffer according to when a first communication session was initiated for the first node and when a second communication session was initiated for the second node;
      generating a tracking list including a predetermined number of positions representing a corresponding number of priorities;
      determining that the predetermined number of positions of the tracking list are full;
      in response to determining that the predetermined number of positions of the tracking list are full:
         determining that no data exists in the buffer;
         in response to determining that no data exists in the buffer:
            removing first information associated with an oldest serviced node from the tracking list, the oldest serviced node being a service node from the tracking list with which it has been longest since the routing device has received communication;
            adding second information associated with a new node to the tracking list;
            adding new data associated with the new node to the buffer; and
            prioritizing the new data in the buffer.

6. The routing device of claim 5,
   wherein prioritizing comprises:
      indicating, via the tracking list, that the second communication session associated with the second node was initiated before the first communication session associated with the first node;

determining, that the second node has a higher priority than the first node based at least in part on priority indicated by the tracking list;
searching the buffer for the second data based at least in part on determining that the second node has the higher priority; and
sending the first data and the second data in the buffer according to the prioritizing, wherein:
the receiving the second data comprises receiving the second data after receiving the first data; and
the sending comprises sending the second data based at least in part on the prioritizing the second data higher than the first data.

7. The routing device of claim 6, wherein the tracking list includes a plurality of positions, and wherein the plurality of positions includes a first position for the second node and a second position for the first node, the first position having a higher priority than the second position, and wherein the prioritizing further comprises:
determining that the second node has a higher priority than the first node based at least in part on the second node being associated with the first position;
searching the buffer for the second data that is designated to be sent to the second node;
identifying the second data in the buffer based at least in part on the searching; and
prioritizing the second data higher than the first data;
wherein the sending comprises sending the second data based at least in part on the prioritizing the second data higher than the first data.

8. The routing device of claim 7, wherein the tracking list indicates a last time of communication from the routing device to the second node during the second communication session, and the operations further comprise:
updating the tracking list to indicate when the second data was sent to the second node during the second communication session.

9. The routing device of claim 7, wherein the operations further comprise:
sending the first data to the first node;
receiving third data designated to be sent to a third node that is supported by the routing device;
storing the third data in the buffer;
determining that the tracking list does not include a position associated with the third node;
determining that the plurality of positions in the tracking list are occupied;
determining that a most recent communication to the first node occurred longer ago than a most recent communication from each node in the tracking list;
removing the first node from the second position in the tracking list; and
adding the third node to a third position in the tracking list, the third position having a least priority from among the plurality of positions in the tracking list.

10. The routing device of claim 6, wherein the routing device comprises a router.

11. The routing device of claim 6, wherein the routing device is a mains powered device, and the first node and the second node are battery powered endpoints.

12. A system comprising:
the routing device of claim 6, wherein the sending comprises wirelessly sending the second data to the second node; and
the second node comprising one or more processors and memory communicatively coupled to the one or more processors, the memory storing one or more instructions that, when executed by the one or more processors, cause the one or more processors to perform operations comprising:
initiating the second communication session with a service provider;
transitioning the second node to a sleep state;
awaking the second node from the sleep state; and
wirelessly receiving the second data from the routing device.

13. One or more non-transitory computer-readable media storing executable instructions that, when executed by one or more processors of a routing device, cause the one or more processors to perform operations comprising:
receiving, from a service provider, first data designated to be sent to a first node that is supported by the routing device;
receiving, from the service provider, second data designated to be sent to a second node that is supported by the routing device;
storing the first data and the second data in a buffer;
prioritizing the first data and the second data in the buffer according to when a first communication session was initiated for the first node and when a second communication session was initiated for the second node;
generating a tracking list including a predetermined number of positions representing a corresponding number of priorities;
determining that the predetermined number of positions of the tracking list are full;
in response to determining that the predetermined number of positions of the tracking list are full:
determining that no data exists in the buffer;
in response to determining that no data exists in the buffer:
removing first information associated with an oldest serviced node from the tracking list, the oldest serviced node being a service node from the tracking list with which it has been longest since the router has received communication;
adding second information associated with a new node to the tracking list;
adding new data associated with the new node to the buffer; and
prioritizing the new data in the buffer.

14. The one or more non-transitory computer-readable media of claim 13,
wherein prioritizing comprises:
determining that the second node has a higher priority than the first node based at least in part on the second node being associated with a first position;
searching the buffer for the second data that is designated to be sent to the second node;
identifying the second data in the buffer based at least in part on the searching; and
prioritizing the second data higher than the first data; and
sending the first data or the second data in the buffer according to the prioritizing, wherein the sending comprises sending the second data based at least in part on the prioritizing the second data higher than the first data,
wherein the first node and the second node comprise a battery powered device configured to enter a sleep state and an active state based at least in part on a communication schedule; and the sending comprises sending at least one of the first data to the first node when the first node is in the active state or the second data to the second node when the second node is in the active state.

15. The one or more non-transitory computer-readable media of claim 14, wherein the first node and the second node are communicatively coupled to a utility meter.

16. The one or more non-transitory computer-readable media of claim 14, wherein the first communication session and the second communication session comprise an authentication session associated with exchanging one or more PDUs with the service provider to authenticate to the service provider.

17. The one or more non-transitory computer-readable media of claim 14, wherein the operations further comprise:
receiving third data designated to be sent to a third node that is supported by the routing device;
storing the third data in the buffer;
determining that the tracking list does not include a position associated with the third node; and
adding the third node to a third position in the tracking list, the third position having a least priority from among the predetermined number of positions in the tracking list.

18. The one or more non-transitory computer-readable media of claim 14, wherein the tracking list indicates a last time of communication from the routing device to the second node during the second communication session, and wherein the operations further comprise:
updating the tracking list to indicate when the second data was sent to the second node during the second communication session.

19. The method of claim 1, further comprising:
repositioning at least one of the nodes supported by the router in the tracking list based on a position of the first node in the tracking list.

20. The routing device of claim 5, wherein the operations further comprise:
repositioning at least one of a plurality of nodes supported by the routing device in the tracking list based on a position of the new node in the tracking list.

* * * * *